United States Patent [19]

Horigome et al.

[11] 4,251,979
[45] Feb. 24, 1981

[54] DEVICE FOR CONVEYING AND ALIGNING BOTTLE-SHAPED CONTAINERS

[75] Inventors: Tatsuo Horigome; Katsuzi Mitani; Yoshiyuki Sakurai; Tadao Hirasawatsu, all of Matsudo, Japan

[73] Assignee: Yoshino Kogyosho Co., Ltd., Tokyo, Japan

[21] Appl. No.: 32,254

[22] Filed: Apr. 23, 1979

[30] Foreign Application Priority Data

Apr. 24, 1978 [JP] Japan .................................. 53-48574
Apr. 24, 1978 [JP] Japan .............................. 53-54351[U]

[51] Int. Cl.³ .............................................. B65B 21/20
[52] U.S. Cl. ........................................... 53/543; 53/247
[58] Field of Search .................. 53/539, 543, 247, 497

[56] References Cited

U.S. PATENT DOCUMENTS

| 2,899,232 | 8/1959 | Walter | 53/247 X |
|---|---|---|---|
| 3,431,698 | 3/1968 | Bathellier | 53/247 X |
| 3,601,951 | 8/1971 | Bargel et al. | 53/539 X |
| 4,117,648 | 10/1978 | Goodman | 53/247 X |

FOREIGN PATENT DOCUMENTS 2020470 11/1971 Fed. Rep. of Germany ............. 53/247

Primary Examiner—Travis S. McGehee
Attorney, Agent, or Firm—Stevens, Davis, Miller & Mosher

[57] ABSTRACT

Bottle-shaped containers of biaxially-oriented blow-molded plastic material are introduced into the space formed between the helical blade continuously rotated and the backup plate of a screw conveyor, and are conveyed in one direction to next conveyor by the rotation of the helical blade of the screw conveyor. The bottle-shaped containers are stood by at the end of the conveyor. When the bottle-shaped containers thus conveyed are aligned in predetermined longitudinal and lateral arrary in predetermined number to be stood by, they are simultaneously held by the bottle-shaped container group holding mechanism utilizing negative pressure, and are then raised from the standby position. The bottle-shaped containers thus raised are lowered directly above the corrugated fiberboard box out of the conveyor to automatically accommodate the bottle-shaped container group thus aligned within the corrugated fiberboard by releasing the holding of the bottle-shaped containers by the bottle-shaped container group holding mechanism.

The suction tubes of the bottle-shaped container group holding mechanism are mounted longitudinally and laterally at an equal interval in the bottle-shaped containers group holding mechanism to attract the bottle-shaped containers as they are aligned and to release them directly above the packaging bench thereby to accommodate and package them in the corrugated fiberboard box.

4 Claims, 14 Drawing Figures

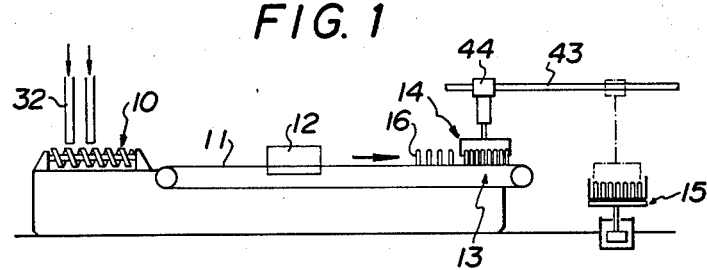
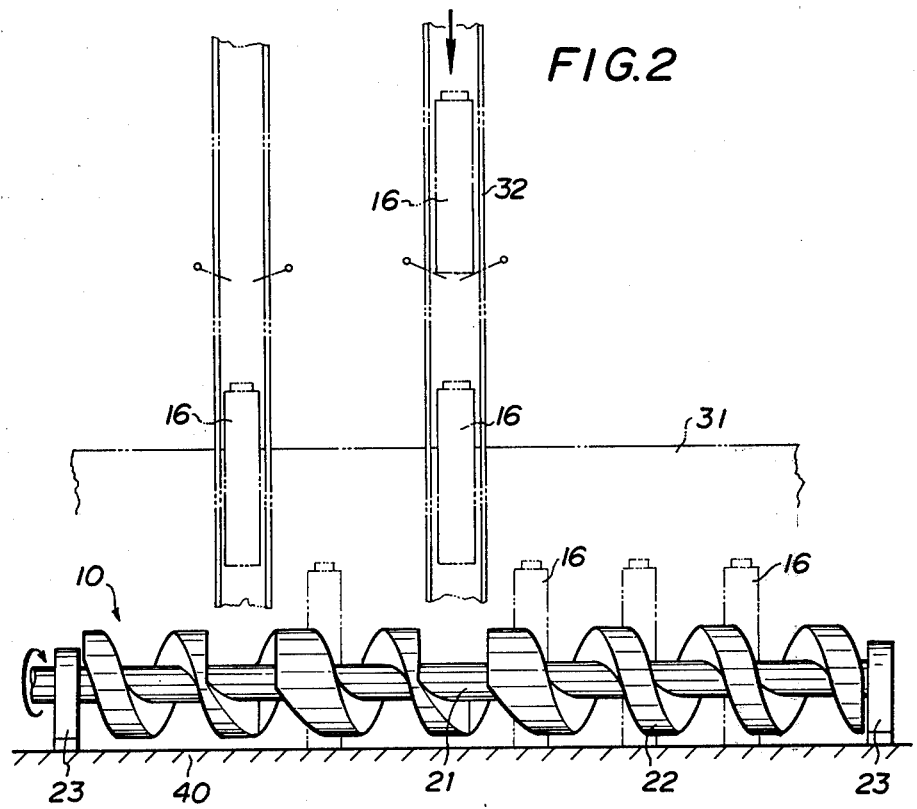

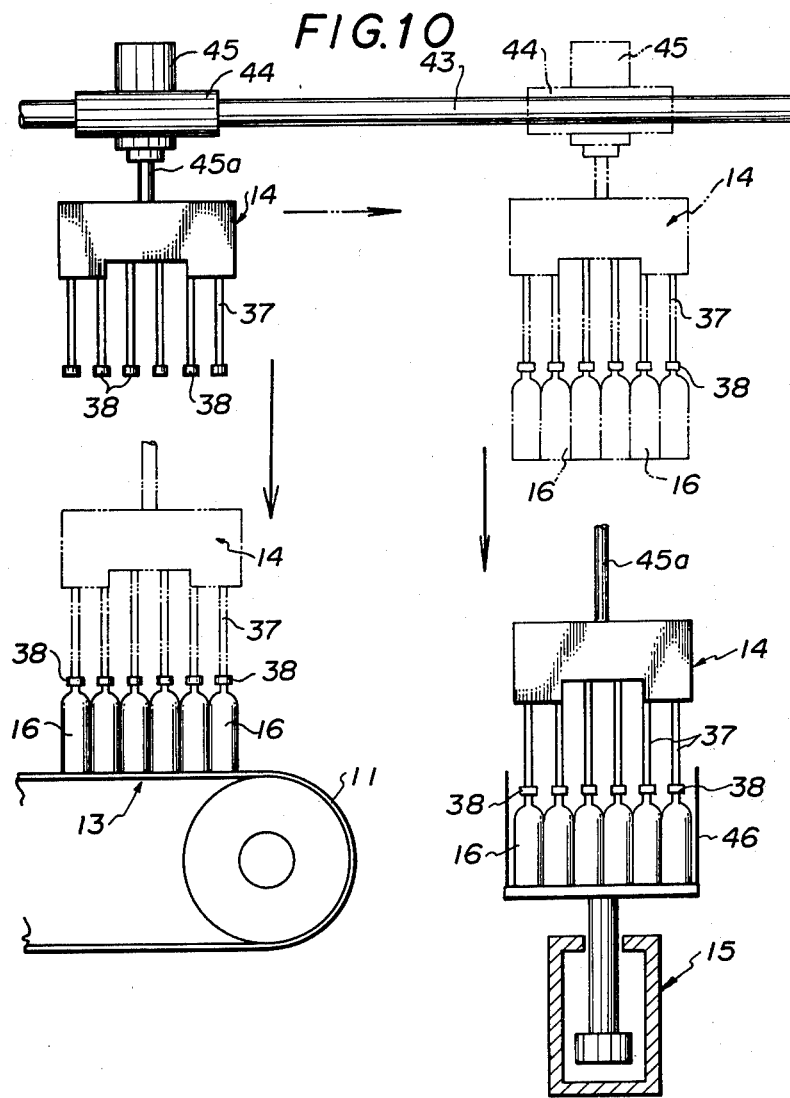

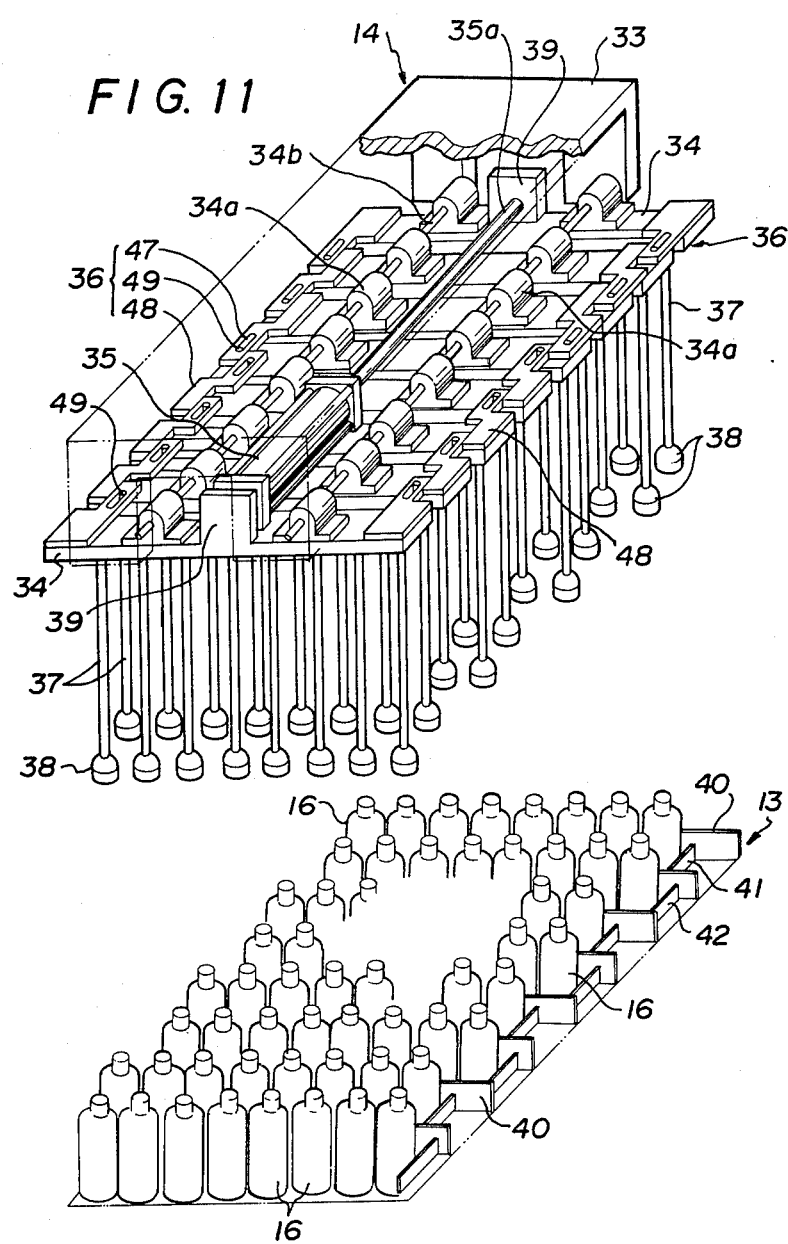

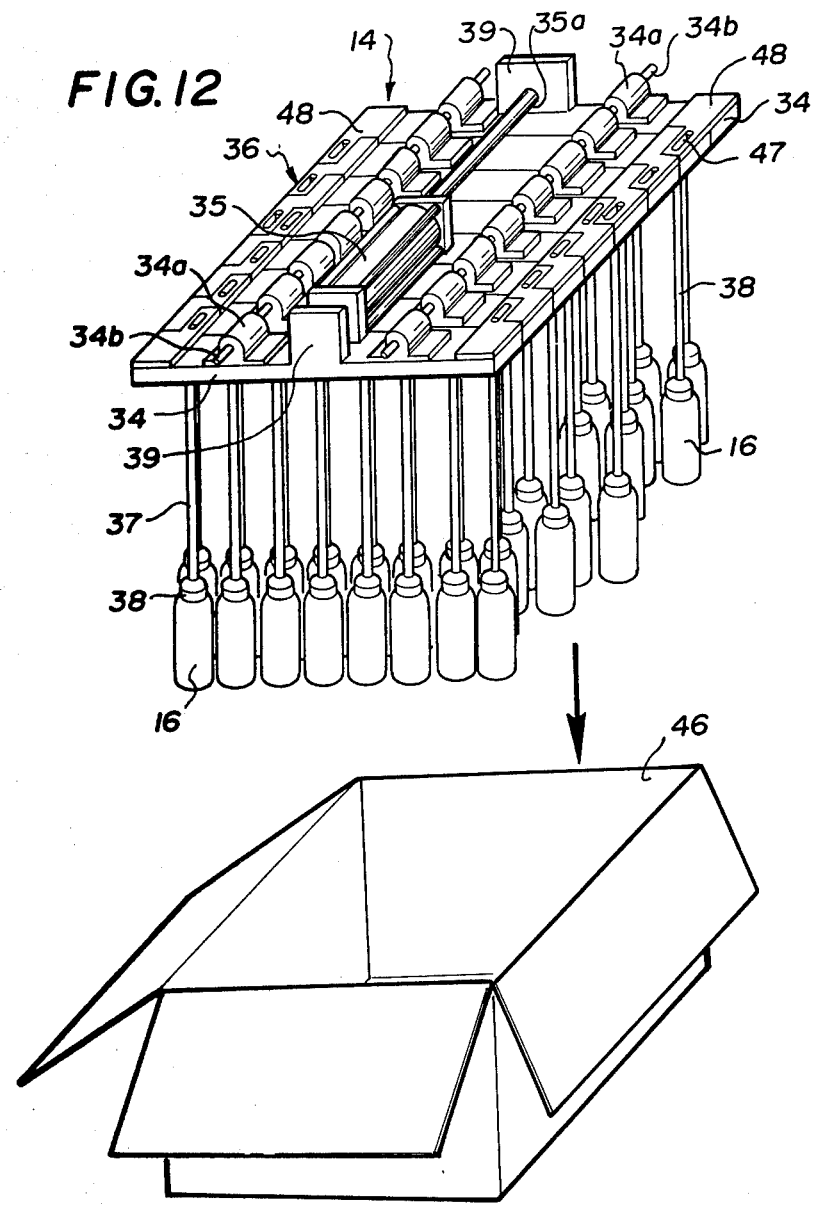

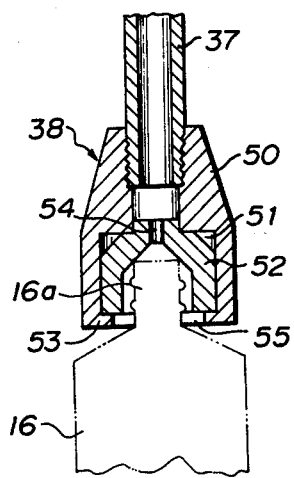
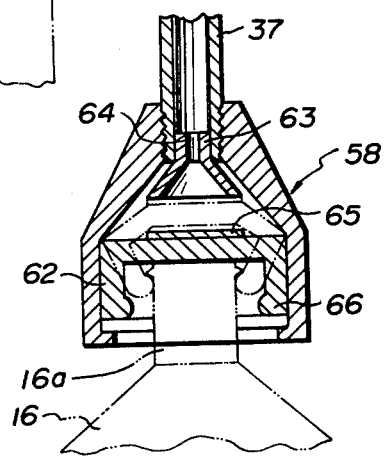

DEVICE FOR CONVEYING AND ALIGNING BOTTLE-SHAPED CONTAINERS

BACKGROUND OF THE INVENTION

The present invention relates to a device for conveying and aligning bottle-shaped blow-molded containers and, more particularly, to a container aligning device for enabling to handle a number of said containers in closely aligned state thereby to perform automation of accommodation of the containers into a packaging box.

There is widely used a screw conveying apparatus which revolves a helical blade mounted around its shaft in predetermined direction as a screw conveyor to feed forward material filled in the space formed between the helical blade and backup plate standing along the helical blade.

In order to convey bottle-shaped containers via such a screw conveyor while maintaining in vertical attitude, it is sufficient that the space formed between the helical blade and the backup plate is slightly larger in size than the diameter of the bottle-shaped containers, however each of the bottle-shaped containers must be dropped in vertical attitude from directly above the space therebetween so as to dispose each of the bottle-shaped containers within the space. Since the helical blade of the screw conveyor is, however, always revolving in predetermined direction, difficulty occurs when the bottle-shaped container is dropped so that the bottle-shaped container collides with the helical blade and is thus easily turned over.

In the meantime, there are also broadly used a variety of devices for aligning numerous products such as containers sequentially conveyed via a conveyor in predetermined array by means of the conveying operation of the conveyor, and automatically conveying and accommodating the containers within a corrugated fiberboard box while maintaining the aligned attitude.

The conventional device operates to dispose a desired number of aligning subdivision plates at an interval corresponding to the thickness of the products in parallel along the conveying direction of the conveyor on the conveyor, to introduce the products into the spaces formed between the aligning subdivision plates in accordance with the conveying operation of the conveyor thereby to naturally align the products in the number of longitudinal lines defined by the aligning subdivision plates on the conveyor, and to convey and accommodate the products thus aligned into a corrugated fiberboard box while remaining the aligned array of the products. If the products are thus conveyed, the spaces formed between the respective products such as bottle-shaped containers become relatively large with the result that it is difficult to accommodate a sufficient number of the bottle-shaped containers as compared with the internal volume of the corrugated fiberboard box.

Accordingly, it is considered to accommodate the products into a corrugated fiberboard box by arranging the products in zigzag state in parallel from the longitudinally aligned products. It certainly increases the number of the products to be accommodated within the same corrugated fiberboard box. It is, however, very difficult to automate the accommodation of the products into the corrugated fiber-board box, and it is not yet performed practically.

SUMMARY OF THE INVENTION

The present invention contemplates to eliminate the aforementioned disadvantages of the conventional device and to devise the configuration of the helical blade by temporarily stopping the horizontal conveyance of bottle-shaped containers via the helical blade in order to completely stand the bottle-shaped container in vertical attitude in the space formed between the helical blade and the backup plate of a screw conveyor.

An object of the present invention is to provide a device for conveying bottle-shaped containers in vertical attitude for the convenience of a work in next step such as an inspection of defective bottle-shaped container or accommodation of bottle-shaped containers.

Another object of the present invention is to provide a device for conveying bottle-shaped containers smoothly in vertical attitude by interferring a bottle-shaped container to be introduced into the space formed between the helical blade and the backup plate of a screw conveyor, with the helical blade by employing the screw conveyor having smaller lead angle of inclined helical blade at the side for forwardly conveying the bottle-shaped container.

Yet another object of the present invention is to provide a device for standing by bottle-shaped containers conveyed in vertical attitude in lateral and longitudinal array, and aligning them for simultaneous holding and automatic packaging.

Still another object of the present invention is to provide a device for standing by predetermined number of bottle-shaped containers at the conveying end of a screw conveyor, holding the bottle-shaped containers thus stood by via negative pressure, and accommodating them in tightly aligned manner within a packaging box.

BRIEF DESCRIPTION OF THE DRAWINGS

These and other objects, advantages, features, and uses will become more apparent as the description proceeds, when considered with the accompanying drawings, in which:

FIG. 1 is a schematic front view of a device for conveying and aligning bottle-shaped containers of a preferred embodiment of the present invention;

FIG. 2 is an enlarged partial front view of the screw conveyor in the device of the present invention;

FIG. 10 is a partial front view of a mechanism for holding and conveying aligned bottle-shaped containers according to the present invention;

FIG. 11 is a perspective view of the mechanism for holding aligned bottle-shape containers as stopped over the aligned bottle-shaped containers group;

FIG. 12 is a perspective view of the mechanism for holding the bottle-shaped container group as moved directly above the corrugated fiberboard box;

FIG. 13 is a vertical sectional view of the chuck in the mechanism for holding the bottle-shaped containers; and FIG. 14 is a vertical sectional view of the chuck of another preferred embodiment of the present invention.

DETAILED DESCRIPTION OF THE PREFERRED EMBODIMENTS

Figure 3:
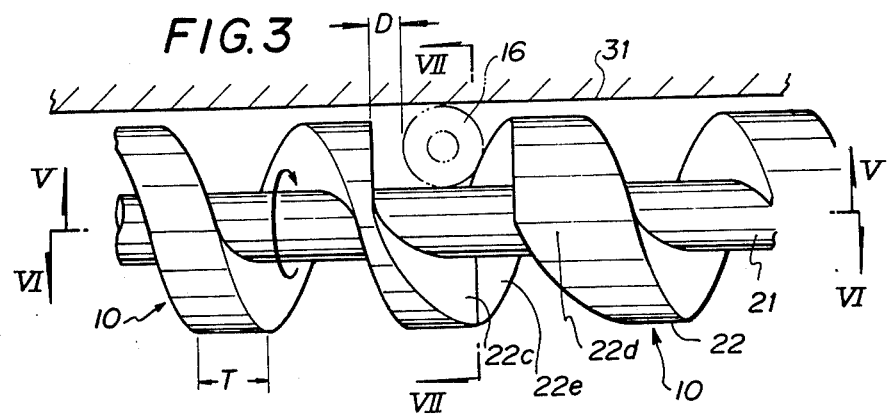
FIG. 3 is an enlarged partial plan view of the screw conveyor showing the state that a bottle-shaped container is dropped into the space formed between the helical blade and the backup plate of the screw conveyor.

Referring now to the drawings, particularly to FIG. 1 showing a preferred embodiment of the present invention, wherein like reference numerals designate the same parts in the following views, the device for conveying and aligning bottle-shaped containers of the present invention has a screw conveyor 10, a feed conveyor 11, a product inspecting unit 12, a bottle-shaped container aligning standby unit 13, a bottle-shaped container group holding mechanism 14, and a packaging bench 15.

The screw conveyor 10 of the present invention is shown in enlarged scale in FIGS. 2 through 7.

In FIGS. 1 and 2, the screw conveyor 10 consists of a helical blade 22 formed around its shaft 21. The shaft 21 with the helical blade 22 is laterally installed via bearings 23 on a flat plate 30 and is driven by a power source (not shown) in rotation in predetermined direction as designated by an arrow. A bottle-shaped container supply unit 32 for dropping sequentially the bottle-shaped containers 16 at predetermined interval as will be hereinafter described in greater detail is provided directly above predetermined position between the shaft 21 and the backup plate 31 of the screw conveyor 10. Reference numeral 16a represents the port of a bottle-shaped container 16.

In the device for conveying the bottle-shaped containers 16 thus constructed, the lead angle of the inclined helical blade 22 of the screw conveyor 10 at the side for forwardly conveying the bottle-shaped container 16 is formed extremely small within desired central angle with respect to the shaft 21. More particularly, in the embodiment shown in the drawings, the helical blade 22 of the screw conveyor 10 is formed to have desired thickness T. The side for forwardly conveying the bottle-shaped container 16 of the helical blade 22 is cut vertically in respect of the shaft 21 so that the lead of the distance axially moved when the helical blade 22 is revolved is set to zero. More concretely in the embodiment, the inclined angle at predetermined side of the helical blade 22 is formed vertical in the range of the central angle of 90° with respect to the shaft 21 resulting that the lead of the distance thereat becomes zero in the amount of one-fourth of one revolution of the helical blade 22.

Figure 7:
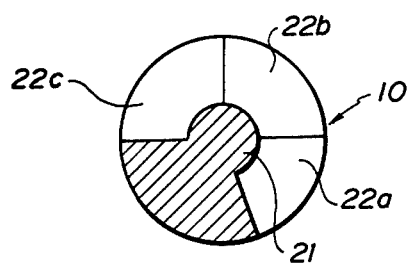
FIG. 7 is a sectional view of the screw conveyor taken along the line VII—VII in FIG. 3.

More specifically with reference to FIG. 7, reference numeral 22a illustrates the normally inclined surface for forwardly conveying the bottle-shaped container 16, 22b the vertical surface cut at zero lead in the range of the central angle of 90° with respect to the axis of the shaft 21, and 22c the inclined surface of short pitch connected from the vertical surface 22b to the next normally inclined surface 22e in the helical blade 22. The inclined surface 22c of short pitch of the helical blade 22 is also formed in the range of the central angle of 90° with respect to the axis of the shaft 21 in the same manner as the vertical surface 22b.

Figure 4:
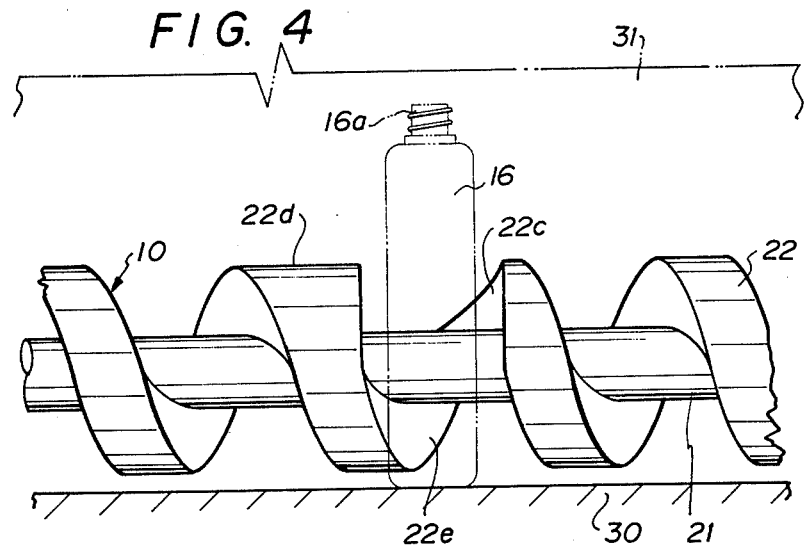
FIG. 4 is a back view of the screw conveyor shown in FIG. 3.
Figure 5:
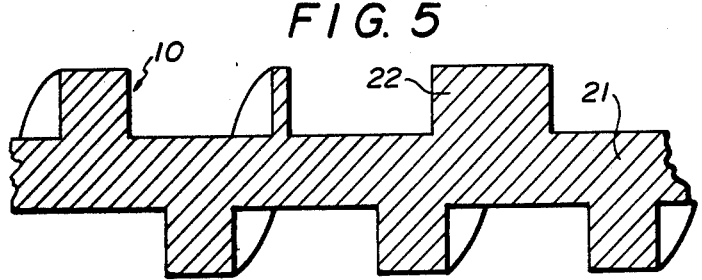
FIG. 5 is a partial sectional view of the helical blade of the screw conveyor taken along the line V—V in FIG. 3.
Figure 6:
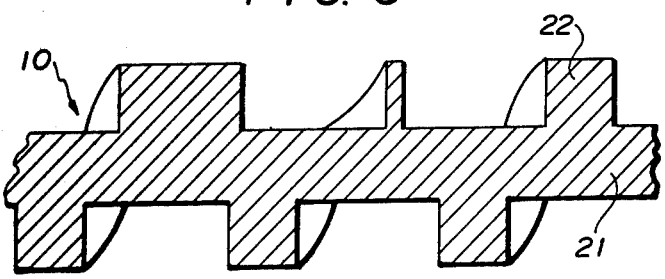
FIG. 6 is a partial sectional view of the helical blade taken along the line VI—VI in FIG. 3.

The dropping period of the bottle-shaped containers 16 in the bottle-shaped container supply unit 32 and the rotating speed of the helical blade 22 of the screw conveyor 10 are so adjusted that, when the helical blade 22 is rotated to the state shown in FIG. 3, namely the vertical surface 22b of the helical blade 22 faces with the backup plate 32, the bottle-shaped container 16 is dropped into the space formed between the helical blade 22 and the backup plate 31 on the flat plate. Although the helical blade 22 of the screw conveyor 10 is continuously revolved in the direction as designated by an arrow, an interval D is formed between the side surface of the bottle-shaped container 16 immediately after dropping into the space formed between the helical blade 22 and the backup plate 31 and the vertical surface 22b of the helical blade 22, because the inclined angle of the side for forwardly conveying the bottle-shaped container 16 is formed to have a lead of zero on the vertical surface 22b of the helical blade 22. Accordingly, the dropped bottle-shaped container 16 stands at dropping position on the flat plate 30 without being pushed by the helical blade 22 until the interval D is shortened by the rotation of the helical blade 22 as shown in FIGS. 3 and 4. When the dropped bottle-shaped container 16 stands stably after a while, it is pushed forwardly by the inclined surface 22c of short pitch of the helical blade 22 by the continuous revolution of the helical blade 22 to slide abruptly horizontally on the flat plate 30 and to be then conveyed horizontally at normal speed by the normally inclined surface 22e connected to the inclined surface 22c of short pitch.

A projected portion 22d is formed at the helical blade 22 at the side facing with the vertical and inclined surfaces 22b and 22c of the helical blade 22 so that the bottle-shaped container 16 may not fall down when it is abruptly pushed by the inclined surface 22c of short pitch while it stands still.

It is appreciated from the foregoing description that the device for conveying the bottle-shaped containers of the present invention can dispose the bottle-shaped container is vertical attitude in the space formed between the helical blade and the backup plate of the screw conveyor and can continuously convey the bottle-shaped container while maintaining the attitude advantageously for the work in the next step.

The bottle-shaped containers 16 transferred from the screw conveyor 10 onto the feed conveyor 11 in the same plane are inspected by the bottle-shaped container inspecting unit 12 for the existence of pin hole, propriety of port, scratches on the body of the bottle-shaped container 16. The improper bottle-shaped container 16 is removed at the inspecting unit 12, and only the proper bottle-shaped containers 16 are conveyed to the standby position at the end of the conveyor 11.

The bottle-shaped container aligning standby unit 13, bottle-shaped container group holding mechanism 14, and packaging bench 15 will now be described in detail, referring to FIGS. 8 through 12.

In the embodiment as shown, a number of the bottle-shaped containers 16 are aligned in longitudinally displaced manner among adjacent bottle-shaped containers, namely in zigzag state in order to package them closely in a corrugated fiberboard box. It is noted that the bottle-shaped containers may also be aligned longitudinally and laterally in square lines and rows, though not shown, instead of the zigzag state.

Figure 8:
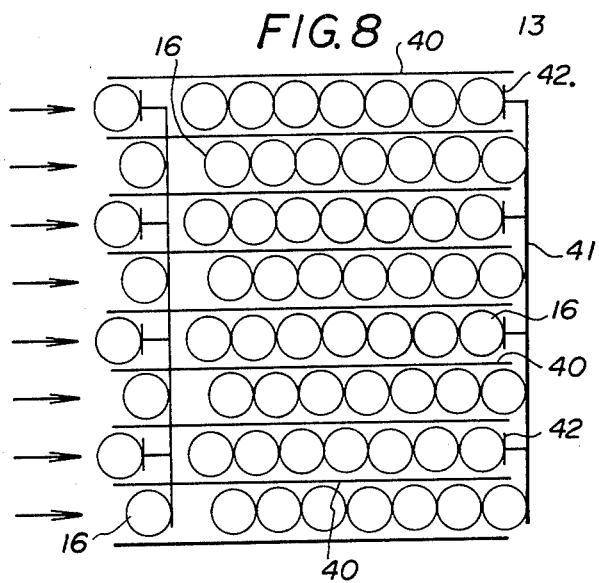
FIG. 8 is a plan view of aligned bottle-shaped containers at the conveyor end.

As shown in FIG. 8 illustrating a plan view of the aligned bottle-shaped containers 16 in the bottle-shaped container aligning standby unit 13, a number of the bottle-shaped containers 16 conveyed via the conveyor 11 are aligned at the end of the bottle-shaped container aligning standby unit 13. This bottle-shaped container aligning standby 13 has a predetermined number of bottle-shaped container aligning subdivision plates 40 longitudinally disposed in parallel at an interval corresponding to the outer diameter of the bottle-shaped container 16 along the conveying direction of the conveyor, and bottle-shaped container positioning plates 41, 42 secured at the ends of the respective bottle-shaped container aligning subdivision plates 40 thereby to align the bottle-shaped containers 16 in predetermined longitudinal and lateral array.

The bottle-shaped positioning plates 41, 42 are so mounted at the end of the bottle-shaped container aligning passages formed via the bottle-shaped container aligning subdivision plates 40 as to stop the bottle-shaped containers 16 in the respective bottle-shaped container aligning passages alternatively. More particularly, the bottle-shaped containers 16 are longitudinally closely aligned along the conveying direction of the conveyor 11, that is, longitudinal direction on the conveyor 11, and are laterally aligned in zigzag state at an interval capable of disposing the bottle-shaped container aligning subdivision plates 40.

There are means for detecting and confirming predetermined number of the bottle-shaped containers 16 introduced into the respective bottle-shaped container aligning passages formed via the bottle-shaped container aligning subdivision plates 40 at the aligned position of the bottle-shaped containers 16 on the conveyor 11 to dispatch necessary command pulses (not shown).

In FIG. 10, the bottle-shaped container 16 group aligned at the end of the bottle-shaped container aligning standby unit 13 on the conveyor 11 is held by the bottle-shaped container group holding mechanism 14, is raised, is then moved rightwardly of FIG. 10, and is lowered to accommodate the bottle-shaped container group in predetermined aligned state in a corrugated fiberboard box 46.

A guide rail 43 is installed over from the conveyor 11 to the packaging bench 15 to support a runner 44, which has an elevator 45 for elevationally movably suspending a rod 45a, at which the bottle-shaped container group holding mechanism 14 is mounted.

The bottle-shaped container group holding mechanism 14 has a frame 33 for so supporting a number of base plates 34 as to be movable, a number of cylinders 35 secured to the center portion of the frame 33 for retracting and extending the base plates 34, respectively, a number of slide linkages 36 provided at both ends of the respective base plates 34, a number of suction tubes 37 suspended from the respective base plates 34, and a number of chucks 38 mounted at the bottoms of the respective suction tubes 37 for attracting the ports 16a of the aligned respective bottle-shaped containers 16.

As shown in FIG. 11, the base plates 34 located at both ends of the group of base plates 34 has each a pair of brackets 39, to which the cylinder 35 is secured at one end and the rod 35a of the cylinder 35 is at the other end. A guide 34a is projected from the top surface of each of the base plates 34 to insert a common guide bar 34b therethrough.

Each of the slide linkages 36 has a connector 48 perforated with a long hole 47 and mounted at the end of each of the base plates 34, and a pin 49 projected from the end of each of the base plates 34 for engaging the connector 48 of the adjacent base plate 34 via the hole 47 of the connector 48.

FIG. 11 shows the partially fragmentary frame 22 of the bottle-shaped container group holding mechanism 14 stopped directly over the aligned bottle-shaped container 16 group at the bottle-shaped container aligning standby unit 13. Since the bottle-shaped containers 16 are aligned to be longitudinally displaced by one-half of the outer diameter of the respective bottle-shaped containers 16 with respect of those among the bottle-shaped container passages in zigzag state at the bottle-shaped container aligning standby unit 13 in the embodiment shown in FIG. 11, the respective suction tubes 37 with the chucks 38 are also mounted in the same zigzag state in the bottle-shaped container group holding mechanism 14. It is noted, though not shown, that the upper ends of the respective suction tubes 37 are connected via a hose to a suction source to effectively operate the chuck 38 of the respective suction tubes 37.

Referring now to FIG. 13 showing one embodiment of the chuck 38 used in the bottle-shaped container group holding mechanism 14 in detail, the chuck 38 has a chuck body 50 mounted at the bottom of the suction tube 37, and an inner buffer 52 formed by elastic material such as rubber provided with the chamber 51 of the chuck body 50. An opening 55 is formed at the bottom of the chamber 51 of the chuck body 50 to receive the neck port 16a of the bottle-shaped container 16. The chuck body 50 has radially inwardly projected peripheral edge 53 formed at the opening 55 for holding the inner buffer 52 within the chamber 51 thereof. The inner buffer 52 has a hole 54 formed to communicate with the suction tube 37 at the top thereof.

FIG. 14 shows another embodiment of the chuck 58 used in the bottle-shaped container group holding mechanism 14. This chuck 58 has a chamber 51 of pentagonal shape in cross section formed within a body 60 thereof, and a deformable inner buffer 62 of inverted U shape in cross section contained in the chamber 61. A flared attracting piece 63 opened downwardly is mounted at the internal bottom of the suction tube 37, and has a hole 64 communicating with the suction tube 37 at the top thereof. A suction plate 65 to be attracted to the attracting piece 63 is bonded onto the top surface of the inner buffer 62. A holder 66 is radially inwardly projected from the bottom periphery of the inner buffer 62 for holding the neck port 61a of the bottle-shaped container 16. The body 60 has an opening 67 perforated at the bottom thereof.

When the bottle-shaped container group holding mechanism 14 is approached directly above the aligned bottle-shaped container group located at the bottle-shaped container aligning standby unit 13 and is then lowered toward the aligned bottle-shaped container group to insert the neck ports 16a of the respective bottle-shaped containers 16 into the chucks 38 at the bottom of the respective suction tubes 37 in the bottle-shaped container group holding mechanism 14 and the respective suction tubes 37 are evacuated to negative pressure, all the aligned bottle-shaped containers 16 are simultaneously attracted by the respective chucks 38. The bottle-shaped container group holding mechanism 14 is raised in this state, is moved along the guide rail 43 via the runner 44, is stopped directly above the corrugated fiberboard box 46 on the packaging bench 15, and is lowered to accommodate the aligned bottle-shaped containers 16 within the corrugated fiberboard box 46 to then package the aligned bottle-shaped container group by supplying the air into the respective suction tubes 37 to release the holding of the respective bottle-shaped containers 16 by the bottle-shaped container group holding mechanism 14.

Figure 9:
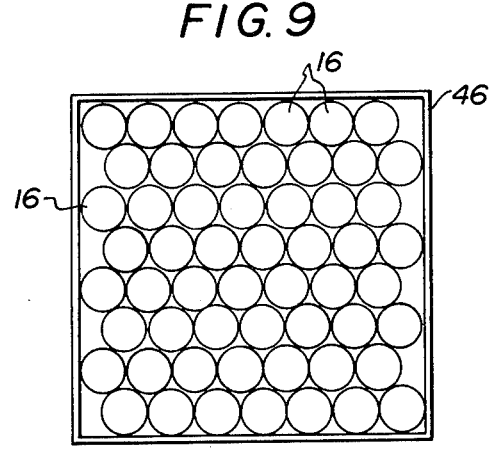
FIG. 9 is a plan view of the aligned bottle-shaped containers accommodated in a corrugated fiberboard box.

The bottle-shaped containers 16 are aligned in zigzag state as shown in FIG. 8. In order to accommodate the bottle-shaped containers 16 aligned more closely as shown in FIG. 9 within the corrugated fiberboard box 46, the cylinders 35 of the bottle-shaped container group holding mechanism 14 are telescoped to sequentially retract the respective base plates 34 via the slide linkages 36 as shown in FIG. 12 to approach the base plates 34 disposed adjacent to each other to each other in closely contact with each other, thereby to lower the bottle-shaped containers 16 thus closely aligned into the corrugated fiberboard box 46. It is noted, though not shown, that the suction tubes 37 of the base plates 34 are mounted longitudinally and laterally in square lines and rows array at an equal interval to attract the bottle-shaped containers 16 as they are and to then release the holding of the bottle-shaped containers 16 by the bottle-shaped container group holding mechanism 14 over the packaging bench 15 to regularly package the bottle-shaped containers 16 in order to package the bottle-shaped containers 16 in square line and row array instead of the zigzag state in the corrugated fiberboard box 46.

Although the specific embodiments of the present invention have been described hereinbefore, it should be understood that numerous variations thereof may be employed without departing from the invention, and it is reiterated that the examples give as above are simply illustrative of the device for conveying and aligning bottle-shaped containers.

We claim:

1. A device for conveying and aligning bottle-shaped containers comprising:
   a screw conveyor for conveying the bottle-shaped containers in vertical attitude in one direction, said screw conveyor having a helical blade formed around the shaft thereof, and a backup plate laterally installed along the helical blade on a flat plate so that the lead angle of the inclined helical blade of said screw conveyor at the side for forwardly conveying the bottle-shaped container is formed extremely small within any central angle with respect to the shaft;
   means to drop said bottle-shaped containers in an upright position between the rotating threads of the screws;
   conveying means connected to said screw conveyor for conveying the bottle-shaped containers to the standby position at the end thereof in wide width;
   bottle-shaped container aligning standby means having a number of bottle-shaped container aligning subdivision plates provided at the conveying end of said conveying means and disposed in parallel, and a number of bottle-shaped container positioning plates for aligning and standing by the bottle-shaped containers in a number of rows, said positioning plates being secured at the ends of said bottle-shaped container aligning subdivision plates to align the bottle-shaped containers in predetermined longitudinally displaced manner by one-half of the outer diameter of the bottle-shaped container alternatively of the longitudinal rows of the bottle-shaped containers;
   packaging means disposed at the forward position of said bottle-shaped container aligning standby means for supporting a packaging unit; and
   bottle-shaped container group holding mechanism movably and elevationally movably suspended along a guide rail installed over and between said bottle-shaped container aligning standby means and said packaging means, said bottle-shaped container group holding mechanism having a frame for supporting a number of base plates, a number of suction tubes mounted at the bottoms of the respective base plates, and a number of chucks mounted at the bottom of said suction tubes.

2. The device according to claim 1, wherein said bottle-shaped container group holding mechanism has a number of base plates connected via a number of slide linkages provided at both ends of the base plates there among, the said slide linkages each has a connector perforated with a long hole and mounted at the end of each of said base plates, and a pin projected from the end of each of said base plates for engaging the connector of the adjacent base plate via the hole of the connector.

3. The device according to claim 1, wherein said bottle-shaped container group holding means has a number of chucks each including a chuck body mounted at the bottom of the suction tube, and a buffer formed within the chamber of said chuck body, said chuck body including an opening formed at the bottom of the chamber thereof to receive the neck port of the bottle-shaped container, and said buffer including a hole formed to communicate with the suction tube at the top thereof.

4. The device according to claim 1, wherein said bottle-shaped container group holding means has a number of chucks each including a chuck body mounted at the bottom of the suction tube, and a chamber of pentagonal shape in cross section formed within said chuck body, and a buffer of inverted U shape in cross section contained in the chamber thereof, and a flared attracting piece opened downwardly and mounted at the internal bottom of the suction tube.

* * * * *